Figure 3:
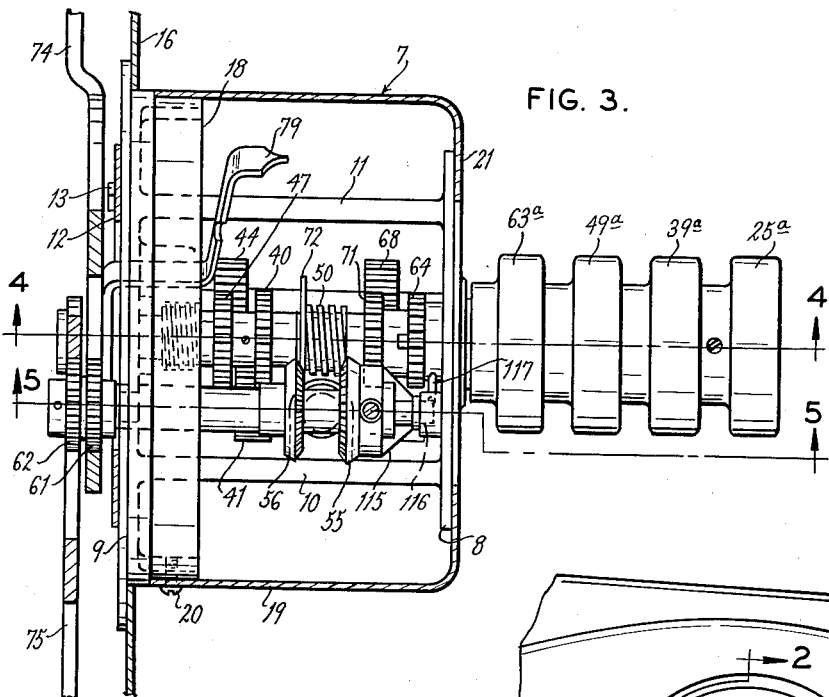

Nov. 15, 1955 L. HUNTER, JR 2,723,555
DYNAMIC BALANCER FOR ROTARY BODIES
Filed Aug. 24, 1953 4 Sheets—Sheet 1

INVENTOR.
LEE HUNTER JR.
BY
ATTORNEYS

Nov. 15, 1955

L. HUNTER, JR 2,723,555

DYNAMIC BALANCER FOR ROTARY BODIES

Filed Aug. 24, 1953

4 Sheets-Sheet 2

INVENTOR.
LEE HUNTER JR.
BY
Gravely Lieder Woodruff Wills
ATTORNEYS

Nov. 15, 1955　　　　　L. HUNTER, JR　　　　2,723,555
DYNAMIC BALANCER FOR ROTARY BODIES
Filed Aug. 24, 1953　　　　　　　　　　　　4 Sheets-Sheet 3

INVENTOR.
LEE HUNTER JR.
BY
ATTORNEYS

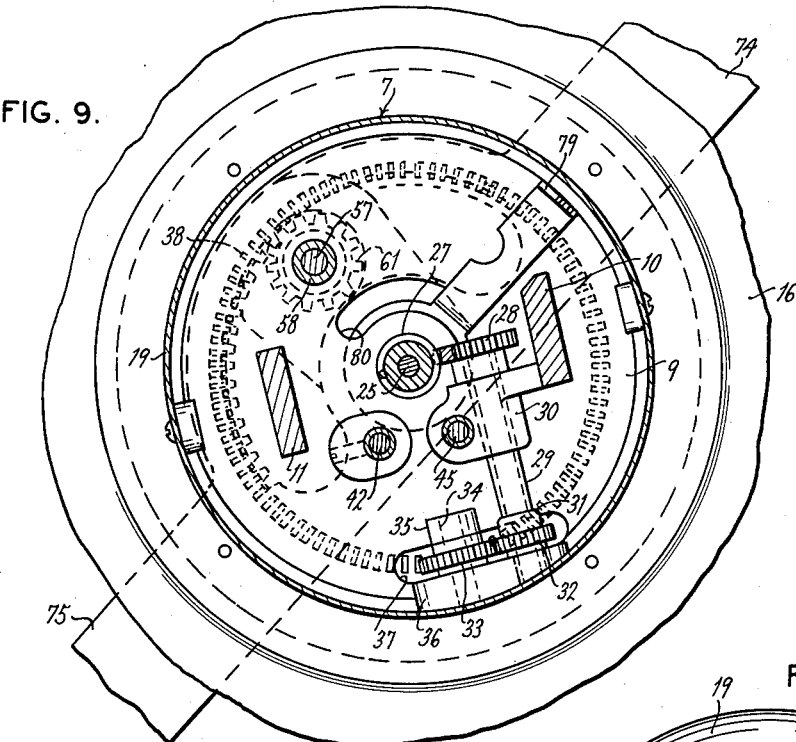
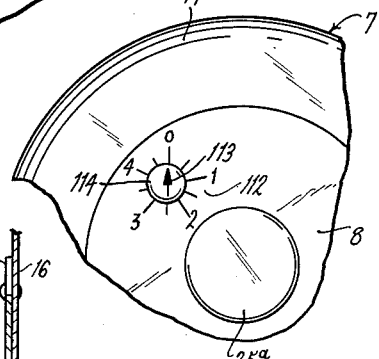
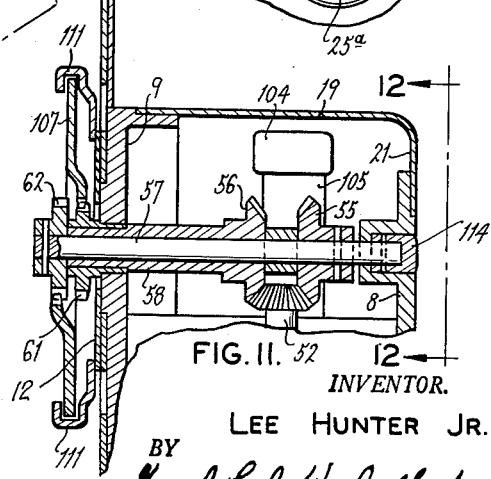

United States Patent Office 2,723,555
Patented Nov. 15, 1955

2,723,555
DYNAMIC BALANCER FOR ROTARY BODIES
Lee Hunter, Jr., Chesterfield, Mo.

Original application August 11, 1949, Serial No. 109,641, now Patent No. 2,662,396, dated December 15, 1953. Divided and this application August 24, 1953, Serial No. 375,880

8 Claims. (Cl. 73—66)

This invention relates to devices for balancing rotary bodies, such as automobile wheels. The principal object of the invention is to provide a device that can be easily carried by hand and readily mounted as a complete unit on a wheel for rotation therewith to quickly and accurately determine the amount of unbalance thereof, and the location and amount of weight required to counterbalance such unbalance without dismounting the wheel from the automobile. Other objects of the invention are simplicity and cheapness of construction, compactness of design, and lightness of weight.

The invention consists in the wheel assembly device and in the parts and combinations and arrangement of parts hereinafter described and claimed.

Figure 1:
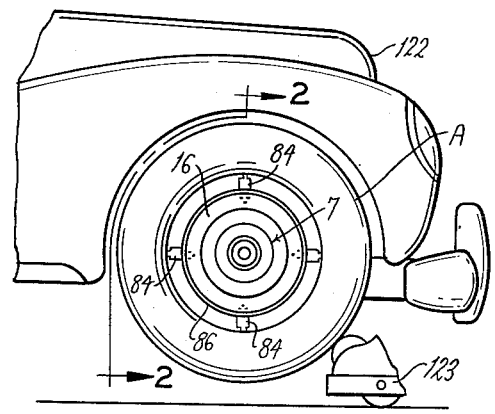
Figure 4:
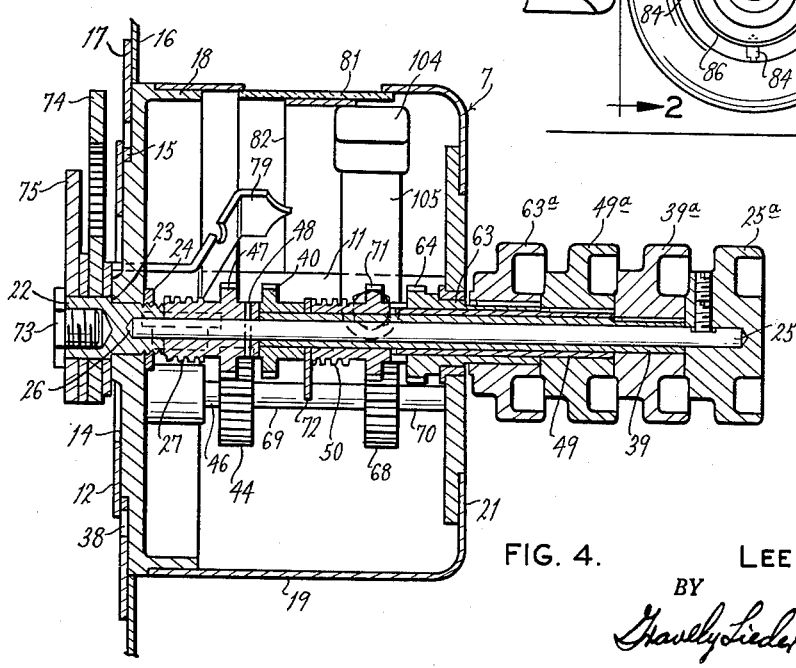
Figure 5:
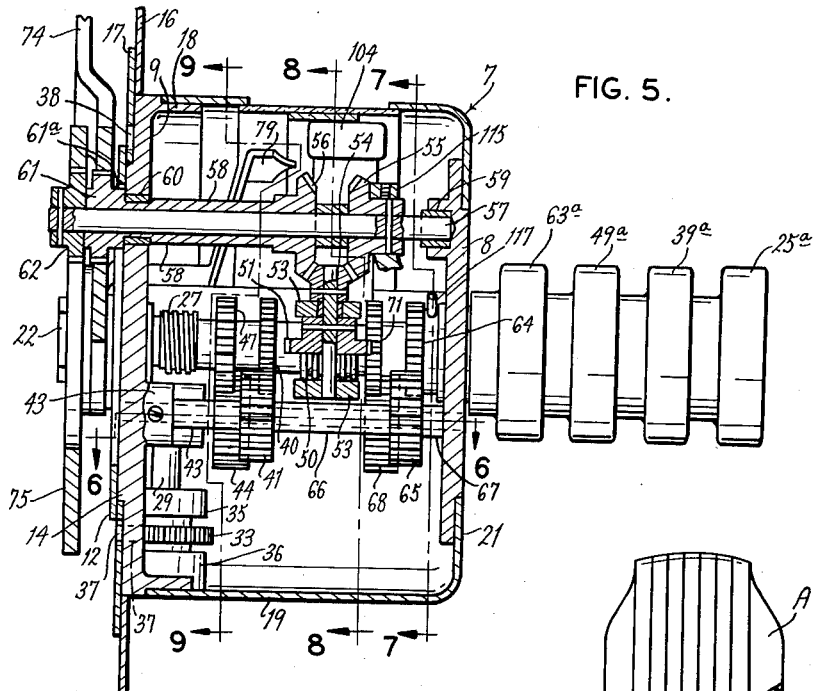
Figure 6:
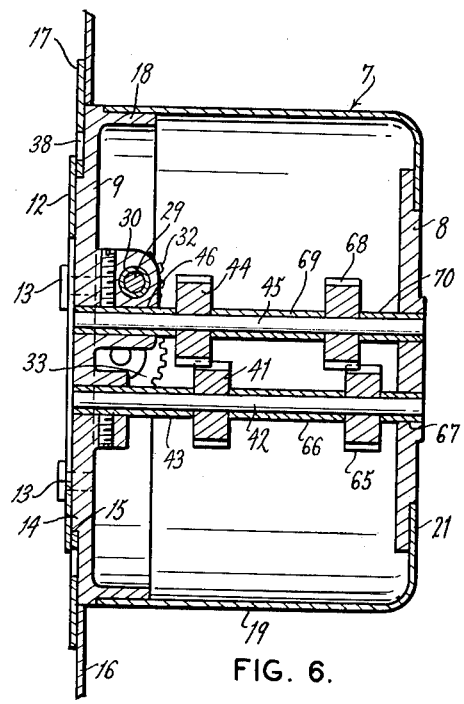
Figure 2:
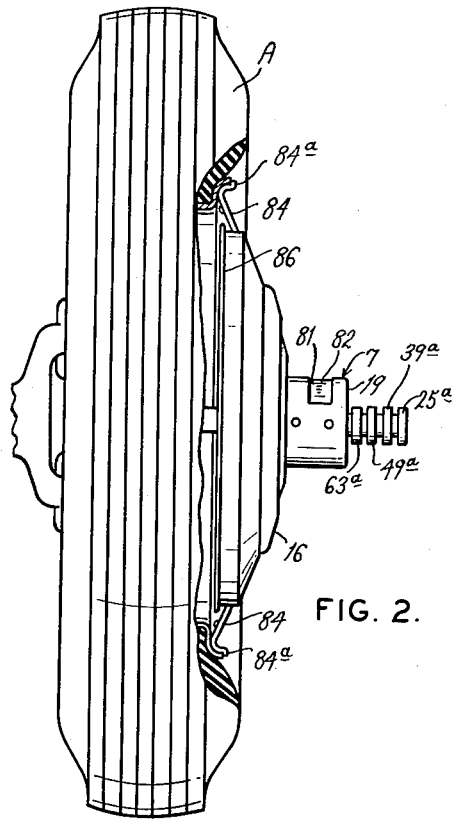
Figure 7:
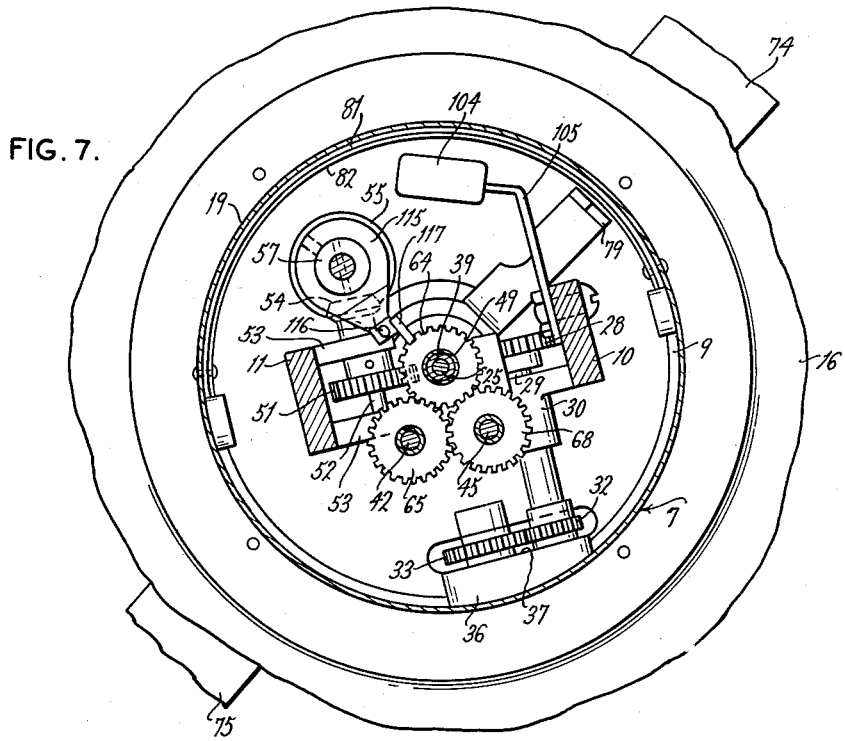
Figure 8:
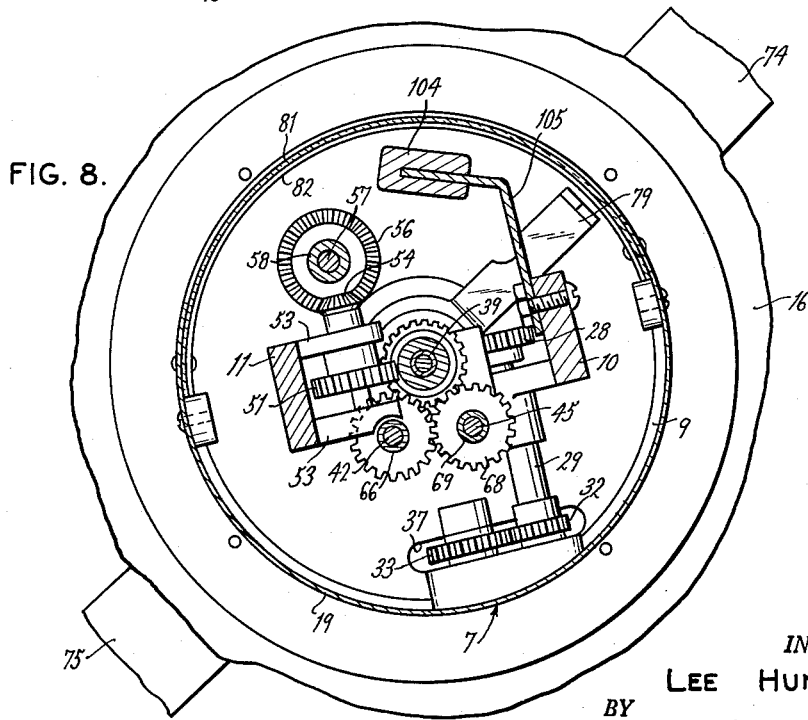

In the drawings:

Fig. 1 is a side elevational view of one side of the front end of a motor vehicle showing the improved wheel balancer installed thereon, Fig. 2 is an edge view of an automobile wheel, partly in section, and taken along the line 2—2 of Fig. 1, Fig. 3 is a side elevational view, partly in section, of the balancing weight adjusting means, Fig. 4 is a sectional view taken along the line 4—4 of Fig. 3, Fig. 5 is a sectional view taken along the line 5—5 of Fig. 3, Fig. 6 is a sectional view taken along the line 6—6 of Fig. 5, Fig. 7 is a sectional view taken along the line 7—7 of Fig. 5, Fig. 8 is a sectional view taken along the line 8—8 of Fig. 5, Fig. 9 is a sectional view taken along the line 9—9 of Fig. 5, Fig. 10 is a plan view of the balancer revealing the balancing weight, Fig. 11 is a sectional view taken along the line 11—11 in Fig. 10, and Fig. 12 is a plan view of the pointer and balancing weight indicia looking in the direction of line 12—12 of Fig. 11.

This application constitutes a division of a prior application filed August 11, 1949 and now Patent 2,662,396, dated December 15, 1953. Reference will be made to the structural and operational description of the form of the invention claimed in said prior parent application for a better understanding of the form of the invention claimed herein.

The device is shown in the drawings for determining the unbalance of an automobile wheel A and to provide information as to the location and amount of weight required to correct such unbalance. The balancer comprises a cage 7 (Figs. 1–9) having a circular outer end wall 8, an annular inner end wall 9 concentric with said outer end wall, two diametrically opposite longitudinal bridges 10 and 11 (Figs. 3 and 8) connecting said outer and inner end walls in axially spaced relation, and a circular plate 12 secured by flatwise screws 13 to an outstanding annular rib 14 formed on the outer end face of said annular end wall around the inner periphery thereof. The end closure plate 12 extends radially outwardly of the annular rib 14 and forms therewith and with the annular inner end wall 9 of the cage 7 a peripheral annular groove 15 therein in which is rotatably supported a gear ring 17 which is riveted to a cup-shaped mounting means having the form of a disc 16 of considerably larger diameter than said inner wall and opens away therefrom. The annular inner end wall 9 of the cage 7 has a rim flange 18 extending in the direction of the outer end wall 8 of said cage; and said cage is provided with a cylindrical casing or cover 19 whose inner end seats on and is secured by screws 20 to said rim flange and whose outer end has an inturned annular flange 21 seating against the outer face of the outer end wall 8 of said cage. The cage 7 with its casing 19 forms a closed cylindrical housing or frame structure and the rotary connection between the inner end of said frame structure and the cup-shaped mounting means or disc 16 permits relative rotary movement of said closed frame structure and mounting means.

Extending through an axial hole provided therefor in the inner end wall 9 of the cage 7 is a stud 22 having an annular shoulder 23 that abuts against the outer face of said wall and a threaded inner end portion on which is threaded a nut 24 for rigidly clamping said stud to said plate. The closed frame structure carries selectively operable means for rotating the frame structure and the balancing weight means together or for changing the radial position of the balancing weight means relative to the axis of wheel rotation. This assembly will now be described. Extending through cage 7 axially thereof is a shaft 25, one end of which is journaled in an axial bore 26 provided therefor in stud 22 and the other end of which has a control element or operating knob 25a secured thereto some distance outwardly from the outer end wall 8 of said cage. Located within the cage is a worm 27 which is mounted on shaft 25 for rotation therewith adjacent to the supporting stud 22. The worm 27 intermeshes with a worm gear 28 (Fig. 9) fixed to a cross shaft 29 journaled near one end in a bearing 30 provided therefor on the longitudinal bridge 10 of said cage. At its opposite end the cross shaft 29 is journaled in a bearing 31 provided therefor in the annular inner end wall 9 of the cage 7 and is provided with a spur gear 32 that intermeshes with a spur gear 33 mounted on a shaft 34 supported radially of cage 7 in a bearing 36 formed on the inner face of the annular inner end wall 9 of said cage and a bearing 35 (Fig. 5) formed on the inner face of the rim flange 18 of said wall. The spur gear 33 rotates through an opening 37 which extends through the annular inner end wall 9 of the cage and opens into the annular peripheral groove 15 in the cage; and said gear intermeshes with a circular gear rack 38 cut in the disc 17 supported in said groove. By this arrangement, relative rotary movement is imparted to cage 7 and the mounting disc by manipulating the knob 25a fixed to the exposed outer end of shaft 25.

Journaled on shaft 25 is a tubular shaft 39 (Fig. 4) whose inner end terminates inside the cage 7 where it is provided with a spur gear 40 that intermeshes with a spur gear idler 41 (Figs. 3 and 5) journaled on a pin 42 secured in walls 8 and 9, a combination sleeve and bearing 43 spacing the gear 41 from wall 9. The spur gear idler 41 meshes with another spur gear idler 44 (Fig. 6) journaled on a pin 45 secured in end walls 8 and 9 parallel to pin 42. The gear 44 is spaced from wall 9 by a combination sleeve and bearing 46. The gear 44 meshes with a gear 47 (Figs. 4 and 5) integral with worm gear 27, each being suitably secured to shaft 25 by means of a pin 48. The tubular shaft 39 extends outwardly beyond the outer end of the cage 7 where it is provided, just inwardly of the operating knob 25a, with a control element or operating knob 39a. By this arrangement relative rotary movement may be imparted to the cage and ring gear 17 by means of knob 25a as well as by means of the knob 39a.

Journaled on the tubular shaft 39 is a tubular shaft 49 terminating inside of cage 7 in worm 50 that intermeshes with a worm gear 51 (Figs. 5 and 8) fixed to a cross shaft 52 journaled in bearings 53 provided therefor in the bridge member 11 of the cage. The tubular operating shaft 49 extends beyond the outer end wall 8 of cage 7 and has a control element or operating knob 49a fixed thereto just inwardly of the operating knob 39a for the operating shaft 39.

Fixed to the cross shaft 52 is a beveled pinion 54 that intermeshes continuously (Fig. 5) with two beveled gears 55 and 56, respectively. The beveled gear 55 is fixed to a shaft 57 and the beveled gear 56 is fixed to a tubular shaft 58 journaled on shaft 57, both shafts being disposed alongside of the tubular shaft 49 in spaced parallel relation thereto. The shaft 57 is supported at one end in a bearing 59 provided therefor in the outer end wall 8 of the cage 7. At the other or inner end of the cage the shafts 57 and 58 extend through a bushing 60 in a hole in the end wall 9 of the cage. The tubular shaft 58 projects (Figs. 5 and 11) beyond the end wall 9 and has a spur gear 61 fixed thereto having a hub 61a abutting the bushing 60 mounted in the end wall 9. The shaft 57 also has a spur gear 62 secured thereto outwardly of and of the same size as spur gear 61 secured to the tubular shaft 58.

Rotatable on the tubular operating shaft 49 and in the central opening in the outer end wall 8 of the cage is a tubular operating shaft 63 provided just inside of said cage with a spur gear 64. The shaft 63 extends outside of the cage and a control element or operating knob 63a is secured to the outer end of said shaft between the outer end wall of said cage and the operating knob 49a for the tubular operating shaft 49. The spur gear 64 meshes with a spur gear idler 65 (Figs. 5 and 6) journaled on pin 42 and is held in axially spaced relation on said pin from gear 41. A sleeve 66 and a combination sleeve and bearing 67 spaces gear 65 from the end wall 8 and from gear 41. The spur gear idler 65 meshes with spur gear idler 68 journaled on pin 45 and is held in axially spaced relation with respect to gear 44 by a sleeve 69, and a combination sleeve and bearing 70 spaces gear 68 from the end wall 8. The spur gear idler 68 meshes with spur gear 71 that is disposed (Fig. 4) adjacent to and integral with the worm 50 on shaft 49.

The control element or knob 25a is locked to shaft 25 by suitable screws and the other control elements or knobs are held in spaced relation by abutting the adjacent knob and a shoulder on the shaft on which the knob is carried. The bores of knobs 39a, 49a and 63a have a flat surface thereon engaging a cooperating flat surface on the respective shafts for preventing relative rotation between the knobs and the shafts.

A member 72 is disposed between the spur gear 40 and worm 50 on the hollow shaft 39 and pin 42 and its associated sleeve 66 and is used as a torque plate for separating worm 50 and gear 40 and preventing the actuation of one gear by the other gear.

Journaled on the central stud 22, between the flange on the flange screw 73 therein and the outer face of the end wall 9 of the inner end of cage 7, are two separate arms 74 and 75 disposed radially of said cage inside of the cup-shaped mounting disc 16 at said end of the cage and terminating at their respective outer ends in weights, not shown in this divisional application, of the same size and shape. The weight arm 74 is provided with an arcuate gear rack 77 disposed concentric to the supporting stud or pivot 22 therefor and intermeshes with the spur gear 61 on the tubular countershaft 58; and the weight arm 75 is provided with a similar arcuate rack 78 that intermeshes with the spur gear 62 on the solid countershaft 57. Secured to the weight arm 74 that intermeshes with the spur gear 61 on the tubular countershaft 58 is a pointer 79 offset laterally to extend through an arcuate slot 80 in the end wall 9, and thence radially outwardly to form an angle and a point directly inside of a transparent window 81 in cover 19. The pointer 79 has a projection 79a extending into an aperture 74b in arm 74 for preventing relative rotation therebetween. The arcuate slot 80 is of sufficient length to accommodate an 80 degree relative rotary movement of the pointer 79 and the cage 7; and the window 81 in casing 19 has a scale 82 marked thereon along one arc of the pointer and graduated in ounces and fractions thereof. The cage casing 19 also has a longitudinal counterweight locating mark 83 on the outer peripheral surface thereof, said mark being located in a plane disposed radially of cage 7 and passing through the axes of countershafts 57 and 58 and the axis of shaft 25 for swinging weight arms 74 and 75 about the axis of the cage 7.

The cup-shaped mounting means or disc 16 (Fig. 2) is provided with four circumferentially spaced mounting fingers 84 extending radially thereof through slots 85 in the outer peripheral wall of said disc just inwardly of a curled rim portion 86 thereof. Radial adjustment of the finger 84 is accomplished in two steps, one large and one small adjustment. By a combination of these adjustments a wide range of radial movement of the finger 84 is possible, thereby readily adapting the wheel balancer to any type and size of wheel.

The parts within the cage 7 and the casing 19 rotate during a balancing operation and in order that this portion of the device may be in balance, a weight 104 (Figs. 7, 8 and 11) is provided that is secured to an arm 105 fastened to bridge 10.

The present form of the invention is illustrated in Figs. 10, 11 and 12 of the drawings in which the motion transmitting means from the weights to knobs 49a and 63a is the same as that shown in the preferred embodiment but in which a radially movable counterweight in the form of a plate 107 is employed. The plate is provided with a slot 108, the longitudinal edges of which are displaced so that gear teeth 109 cut in one edge, mesh with gear 61, and gear teeth 110 cut in the other edge mesh with gear 62. Selective rotation of knobs 49a and 63a moves the counterweight plate 107 radially with respect to the axis of the balancing device. The plate 107 is slidably mounted in ways 111 carried by closure plate 12 secured to the end wall 9 and is angularly turned or rotated by knobs 25a and 39a. Suitable indicia 112 for indicating the amount of unbalance of the wheel, is engraved on the wall 8 and a pointer 113 is provided on an extension 114 on shaft 57 for indicating the amount of the balancing weight to be attached to the wheel. This means of Fig. 12 also indicates by its position circumferentially of the axis of the knobs the place on the wheel where the balancing weight should be attached. In other words, the radial outward location of the shaft extension 114 relative to the center of wall 8 can be used to point out the proper location on the wheel for the indicated weight, such as that in Fig. 12, the position of extension 114 indicates the weight should be placed upwardly to the left of a vertical line through the center of knob 25a and the center of extension 114.

Means have been provided for preventing the jamming of gears 61 and 62 in the gear slots cut in weight arms 74, 75 and in plate 107. The gear 55 (Figs. 5 and 7) has an arm 115 secured thereto and provided with a hardened screw 116 engageable with a pin 117 secured to gear 64. These gears are so related that arm screw 116 will be engaged by pin 117 just before gears 61 and 62 reach the end of travel in the slots of the weight arms 74, 75 and plate 107, thereby preventing further rotation of knobs 49a and 63a and the parts connected thereto.

When it is desired to balance the automobile wheel A, the hereinbefore described balancing device is mounted on said wheel on vehicle 122 concentric with the axis of wheel rotation by placing the cup-shaped mounting disc 16 opposite the outer face of the wheel and seating the curved ends of the mounting finger 84 of said disc in the concave annular depression formed in the outside face of the wheel rim by the outwardly curved peripheral outside marginal rim flange of the rim thereof, said finger having been previously adjusted for the rim diameter of the wheel. The ends of the mounting fingers 84 are then positioned on the rim flanges of the wheel, the curved ends 84a fitting against the curve in the wheel rim. By this arrangement the entire balancing device, including the cage 7, mounting disc 16, and counterbalancing plate 107, or weighted arms 74 and 75, is secured to the wheel concentric therewith for rotation about the axis thereof, the control elements being located outwardly of the wheel where they may be easily manipulated. One of the knobs 49a, 63a is then turned to move the arms 74 and 75 relative to one another into a slidably unbalanced position, such that both arm weights (not shown) are in a position, say with the pointer 79 at the 1½ oz. position, on the scale 82. The arms move away from each other when one knob is turned and toward each other when the other knob is turned. The wheel with the balancing device mounted thereon is then jacked up and rotated on its axis, each of the front wheels being rotated by means of a suitable power driven spinner 123 engaging the tread of the tire on wheel A, and the rear wheels being driven from the engine of the automobile.

With the balancing device adjusted and mounted on the wheel in the manner above described, the magnitude and location of the weight required to correct the running or dynamic unbalance of the wheel can be found by spinning the wheel at a speed at which such unbalance will produce considerable vibration and be observed visually or by sense of touch, then holding the knob 49a or 63a until such vibration is reduced to a minimum, and then holding the knob 25a or 39a until no vibration is produced by the rotating wheel. The wheel is then stopped and a mark noted on the wheel rim indicating that the counterweight for correcting the unbalance of the wheel should be attached to the rim at that point, while the radial pointer 79 indicates on the scale 82, the magnitude of such correction weight. A correction weight of the magnitude indicated on the scale 82 is then applied to the outside flange of the wheel rim at the point indicated by the pointer to thereby correct the unbalance of the wheel. The balancing device is then removed from the wheel by disengaging the curved ends 84a of finger 84 from the rim thereof. Stopping or slowing down the rotation of knob 25a with the rotating wheel, produces relative rotary movement of said wheel and the counterbalance plate 107, or two balancing weight arms 74 and 75, in one direction; and stopping or slowing down the rotation of knob 39a produces relative rotary movement of said wheel and balancing plate or weight arms in the opposite direction. Thus, by manipulating knobs 25a and 39a, the cage 7 and the plate 107, or arms 74 and 75, may be rotated in either direction as a unit relative to the rotating wheel and the mounting disc 16 fixed thereto so that when the vibration of the rotating wheel is reduced to a minimum, the plate 107, or the component of the weight arms, is located in the side of the wheel opposite the heavy spot therein and, in the case of the arm weights the latter are located on opposite sides of and equally distant from a diametrical line passing through the heavy spot of the wheel. Stopping or slowing down the rotation of one of the two knobs 49a and 63a with the rotating wheel causes the two arms 74 and 75 to move equal distances toward one another, thereby increasing the effective counterweight; and a similar manipulation of the other of said knobs causes said weight arms to move equal distances away from each other for decreasing the counterbalancing effect thereof. When the arms 74 and 75 are diametrically opposite each other, they are in equilibrium and have no counterbalancing effect on the wheel; and when they are swung together they provide a maximum counterbalancing effect. Similarly, when the plate 107 is extended radially its counterbalancing effect is increased, and when it is radially withdrawn to a centered position (full line in Fig. 10) its effect is practically neutralized. Thus the plate 107 has its mass movable along a line which intersects the axis of rotation and when the mass is on such rotary axis it has no effect as a balancing weight.

The operation of the device illustrated in Figs. 10, 11 and 12 of the drawings is similar to that described in the embodiment of the invention forming the subject matter of the said prior application, Serial No. 109,641. The plate 107 being moved off center in ways 111 and then rotatably adjusted on the gear ring 17, will point the position at which the counterweight is to be applied to the rim.

From the foregoing it is obvious that the hereinbefore described wheel balancing device is light, strong, durable, compact and simple as well as economical to manufacture. The device can be easily carried by the hand and readily mounted on and dismounted from the wheel as a complete self-contained unit. The location and magnitude of the correction weight required to balance the wheel can be quickly and easily determined merely by lightly gripping the different readily accessible central knobs of the unit as it rotates with the wheel.

Obviously, the hereinabove described balancing device admits of considerable modification without departing from the invention. Therefore, I do not wish to be limited to the precise construction shown and described.

What I claim is:

1. A device for determining and correcting the dynamic unbalance of a rotating wheel comprising mounting means adapted for removable attachment to one face of a wheel, a frame structure operatively carried on said mounting means substantially centered on the wheel axis for rotation with and relative to the wheel, balancing weight means, means carried by said frame structure to support said balancing weight means and limit movement thereof to movement radially in and out relative to the axis of wheel rotation, selectively operable means carried by and projecting axially outwardly of said frame structure, said selectively operable means being connected to said balancing weight means and mounting means for selectively rotating said frame structure and balancing weight means relative to said mounting means and for changing the radial position of said balancing weight means relative to the axis of wheel rotation, and rotatable control elements connected to said selectively operable means, said control elements being located substantially in the axis of wheel rotation outwardly of said balancing weight means.

2. A device for determining and correcting the dynamic unbalance of a rotating wheel comprising mounting means adapted for removable attachment to one face of a wheel, a frame structure operatively carried on said mounting means substantially on the wheel axis for rotation with and relative to the wheel, balancing weight means, means on said frame structure opposite the wheel face to support said balancing weight means for movement in a linear path directed radially relative to the axis of wheel rotation, selectively operable means supported by said frame structure and connected to said balancing weight means and mounting means from one side of said mounting means for rotating said frame structure and balancing weight means relative to said mounting means and for changing the radial position of said balancing weight means relative to the axis of wheel rotation, said selectively operable means including operating shaft means extending outwardly of said frame structure along the axis of wheel rotation, and control elements operatively connected to said shaft means and being positioned substantially on the axis of wheel rotation adjacent the outer ends of said shaft means.

3. A device for determining and correcting the dynamic unbalance of a rotating wheel comprising mounting means adapted for removable attachment to one face of a wheel, a frame structure movably connected to said mounting means outwardly of the wheel face and substantially centered with the wheel axis for rotation with and relative to the wheel, balancing weight means, means on said frame structure spaced from the wheel face to engage said balancing weight means and limit movement thereof to movement radially inwardly and outwardly of the axis of wheel rotation in a plane parallel to the wheel face, shaft means carried by said frame structure and extending outwardly thereof along the axis of wheel rotation, selectively operable means carried by said frame structure at one side of said mounting means and operatively connecting said shaft means with said balancing weight means and with said mounting means, certain of said selectively operable means effecting a change in the radial position of said balancing weight means relative to the axis of wheel rotation, and certain others of said selectively operable means effecting rotation of said frame structure and balancing weight means relative to said mounting means, and substantially axially centered control elements operatively connected to the outwardly extending end portions of said shaft means.

4. A device for determining and correcting the dynamic unbalance of a rotating wheel including: a mounting frame adapted for removable attachment to one face of a wheel; a frame structure extending axially outwardly of the wheel face and movably connected to said mounting frame for rotation with and relative to the wheel; a balancing weight disposed axially inwardly of said frame structure; means operatively connecting said balancing weight to one side of said frame structure for rotation of said balancing weight with said frame structure upon rotation of said frame structure with and relative to said mounting frame, and for limiting bodily displacement of said balancing weight to movement radially relative to the axis of wheel rotation; separate selectively operable means carried by said frame structure at the other side of said mounting frame, one of said selectively operable means being connected to said balancing weight to effect a radial change of position of said balancing weight, and another of said selectively operable means being connected to said mounting frame for rotating said frame structure relative to said mounting frame; and control elements located axially outwardly of said frame structure substantially in the axis of wheel rotation for controlling the operation of said separate selectively operable means.

5. A device for determining and correcting the dynamic unbalance of a rotating wheel including: a mounting frame adapted for removable attachment to one face of a wheel; a frame structure carried on said mounting frame substantially centered with the axis of wheel rotation and rotatable with and relative to said mounting frame; guide means on said frame structure; a balancing weight slidably mounted on said guide means and constrained thereby to linear displacement in a radial direction relative to the axis of wheel rotation, said guide means carrying said balancing weight with said frame structure upon rotation of the latter with and relative to said mounting frame; controllable operating means carried by said frame structure at one side of said mounting frame in position connected to said balancing weight and to said mounting frame, said controllable operating means including shaft means extending outwardly from said frame structure along the axis of wheel rotation; and control elements mounted upon said shaft means for selectively energizing said operating means upon wheel rotation, at least one of said control elements being adapted to rotate said frame structure and balancing weight relative to said mounting frame and at least one other of said control means being connected to said shaft means and adapted to effect a radial change of position of said balancing weight relative to the axis of wheel rotation.

6. A device for determining and correcting the dynamic unbalance of a rotating wheel including: a mounting frame adapted for removable attachment to the face of the wheel; rack means fixed on said mounting frame centered to the axis of wheel rotation; a frame structure carried on said mounting frame centered to the axis of wheel rotation, said frame structure extending outwardly at one side of said mounting frame and being rotatable with and relative to said mounting frame; a balancing weight; means carried by said frame structure for connecting said balancing weight thereto for rotation with said frame structure and for bodily displacement in a direction radially in and out relative to the axis of wheel rotation; selectively operable gear means carried by said frame structure, certain of said gear means being in position operably connected to said rack means for rotating said frame structure and balancing weight as a unit relative to said mounting frame, and others of said gear means being operably connected to said balancing weight for bodily displacing said weight means in the radial direction in and out relative to the axis of wheel rotation; and control elements located in the axis of wheel rotation outwardly of said frame structure, said control elements being operatively connected to said gear means to effect selective operation thereof.

7. A device for determining and correcting the dynamic unbalance of a rotating wheel comprising a mounting frame removably attached to a wheel face, a gear rack disc fixed on said mounting frame substantially centered to the wheel axis, a frame structure operatively carried at one side of said mounting frame adjacent said gear rack disc for rotating with and relative to said mounting frame, balance weight means; means operatively carried on said frame structure and connected to said balance weight means for bodily displacing the latter in and out in a radial direction relative to the wheel axis, coaxial shaft means extending outwardly from said frame structure along the wheel axis, gear means carried by said frame structure, certain of said gear means operatively connecting certain of said coaxial shaft means to said gear rack disc and others of said gear means connecting certain other of said coaxial shaft means to said balance weight; and control elements operatively connected to the outward ends of said coaxial shaft means in the wheel axis to operate said shaft means selectively for effecting operation of said gear means.

8. A device for determining and correcting the dynamic balance in a wheel comprising: mounting means adapted for removable attachment to one face of the wheel to be balanced, frame means operatively carried on said mounting means to rotate with and for rotational adjustment relative to said mounting means about an axis substantially in the axis of wheel rotation; movable weight means; means carried by said frame means to support said movable weight means and limit movement thereof to movement generally radially in and out relative to the axis of wheel rotation; selectively operable means carried by said frame means, said selectively operable means including control elements, which control elements are disposed outwardly of said frame means and are mounted on said frame means for rotation relative thereto about an axis substantially in the axis of wheel rotation, and motion transmitting means continuously connecting said selectively operable means with said movable weight means and with said mounting means for selectively changing the radial position of said movable weight means and for rotating said frame means and said movable weight means relative to said mounting means when said control elements are selectively manipulated to change their speed relative to wheel speed.

References Cited in the file of this patent

UNITED STATES PATENTS

| | | |
|---|---|---|
| 1,296,732 | Akimoff | Mar. 11, 1919 |
| 1,392,028 | Torbet | Sept. 27, 1921 |
| 2,241,637 | Ernst et al. | May 13, 1941 |